(12) United States Patent  
Czachor, Jr. et al.

(10) Patent No.: US 9,584,663 B2  
(45) Date of Patent: Feb. 28, 2017

(54) SYSTEM AND METHOD FOR CONTROLLING IDENTIFIER PROVIDED WHEN RETURNING CALL / MESSAGE

(71) Applicant: ASD Inc., Media, PA (US)

(72) Inventors: Martin Czachor, Jr., Newtown Square, PA (US); Kevin Czachor, West Chester, PA (US); Norman Franke, Garnet Valley, PA (US); Gary Foster, Media, PA (US)

(73) Assignee: ASD Inc., Media, PA (US)

( * ) Notice: Subject to any disclaimer, the term of this patent is extended or adjusted under 35 U.S.C. 154(b) by 0 days.

(21) Appl. No.: 14/615,595

(22) Filed: Feb. 6, 2015

(65) Prior Publication Data

US 2016/0234389 A1    Aug. 11, 2016

(51) Int. Cl.
*H04M 1/56* (2006.01)
*H04M 15/06* (2006.01)
*H04M 3/42* (2006.01)
*H04M 3/523* (2006.01)
*H04M 3/51* (2006.01)

(52) U.S. Cl.
CPC ....... *H04M 3/5231* (2013.01); *H04M 3/5175* (2013.01); *H04M 3/42059* (2013.01); *H04M 3/42221* (2013.01)

(58) Field of Classification Search
CPC .... H04M 1/576; H04M 1/2745; H04M 1/578; H04M 3/42068; H04M 3/42195; H04M 3/56

USPC .............. 379/142.01, 142.07, 142.1, 207.15, 379/210.01, 211.02, 88.11, 88.12

See application file for complete search history.

(56) References Cited

U.S. PATENT DOCUMENTS

| | | | | |
|---|---|---|---|---|
| 5,864,612 | A * | 1/1999 | Strauss | H04Q 3/0029 379/142.03 |
| 5,901,209 | A * | 5/1999 | Tannenbaum | G07B 17/0008 379/111 |
| 7,778,399 | B2 * | 8/2010 | Ambrose | H04M 1/56 379/142.01 |
| 7,995,727 | B1 * | 8/2011 | Chmara | H04M 1/57 370/352 |
| 7,995,730 | B1 * | 8/2011 | Zhang | H04M 3/42059 379/142.09 |
| 8,467,515 | B2 | 6/2013 | Czachor, Jr. et al. | |
| 8,498,399 | B2 | 7/2013 | Czachor, Jr. et al. | |
| 8,548,149 | B2 | 10/2013 | Czachor, Jr. et al. | |

(Continued)

*Primary Examiner* — Quoc D Tran
(74) *Attorney, Agent, or Firm* — Steven H. Meyer, Esq.

(57) ABSTRACT

An application instantiated on a computing device of a professional receives transmitted information on an incoming call from a client and displays same, including an identifier of the client by which the professional can place a return call thereto. Upon the professional selecting the identifier of the client, the application presents a number of options for an identifier of the professional to be provided with the return call, receives a selection of one of the options, places the return call from the professional to the client, and in doing so provides the selected identifier of the professional. The provided identifier of the professional represents a favored location at which the professional or an associate may be reached. The client may ascertain the provided identifier from the return call and employ same to place a future call toward the professional or the associate.

14 Claims, 4 Drawing Sheets

(56) References Cited

U.S. PATENT DOCUMENTS

| | | | |
|---|---|---|---|
| 2004/0266415 A1* | 12/2004 | Belkin | H04M 3/42042 455/415 |
| 2007/0298774 A1* | 12/2007 | Naick | H04M 3/42042 455/415 |
| 2009/0034698 A1* | 2/2009 | Karnalkar | H04W 4/12 379/88.22 |
| 2012/0033800 A1* | 2/2012 | Czachor, Jr. | H04M 3/533 379/214.01 |
| 2015/0133096 A1* | 5/2015 | Chatterjee | H04W 4/16 455/415 |

* cited by examiner

SYSTEM AND METHOD FOR CONTROLLING IDENTIFIER PROVIDED WHEN RETURNING CALL / MESSAGE

FIELD

The present disclosure relates generally to answering services, such as answering services for professionals such as doctors, lawyers, funeral directors, servicing representatives, and the like. More particularly, the present disclosure relates to such an answering service where a client or the like calls or otherwise attempts to contact a professional with regard to a matter, the call is diverted to the answering service, the answering service notifies the professional regarding the call, and the professional places a return call to the client. Specifically, the present disclosure relates to allowing the professional to control an identifier thereof as provided in the return call to the client. Accordingly, if the identifier is a telephone number of the calling device of the professional, for example, the professional can hide such telephone number, or can select an alternative telephone number to provide as the identifier.

BACKGROUND

In many business- or professional-related situations or the like, an age-old and recurring problem is effectuating contact between a professional or the like and a client or the like calling or otherwise attempting to contact the professional. Perhaps ideally, the client would place a telephone call or the like to the professional, the professional would answer the placed telephone call instantaneously if not within a matter of moments, the desired contact would thus be established, and the caller and professional could communicate regarding some matter of interest. Notably, however, most professionals are not always available to answer all calls instantaneously or even momentarily. For example, the professional simply may not want to answer calls, such as for example if on a vacation or at a family event, among other things, or the professional may be otherwise occupied by professional matters.

With regard to the latter case in particular, it may be that a doctor may be occupied by a medical matter and unavailable, or a lawyer may be in a legal conference from which she or he is not to be disturbed. Likewise, a funeral director may be attending to a first client while a second client is calling. In such a particular situation as well as others, it should be noted that not only is the funeral director otherwise occupied by the first client, but the nature of the funeral business is such that it would be considered to be particularly insensitive if not rude to answer the call from the second client while still attending to the first client.

Generally, it is to be recognized that a professional or the like may not always be immediately available to answer a call or other message from a client (hereinafter, 'call'), be it to a landline telephone line, a mobile telephone line, a pager, a mobile or immobile messaging/texting device, an application instantiated on any such device, or to such other communications device or applications thereon which may be available. As should be appreciated, such a situation can exist even when the client is calling regarding an urgent matter, such as a life-threatening matter or a matter that otherwise should be given immediate attention. Accordingly, it is known that such a professional may employ a business organization that provides answering services or the like (hereinafter, 'an answering service') to answer calls from clients when the professional is not immediately available.

As should be understood, a call to the professional is forwarded therefrom to the answering service by appropriate means when the professional is not available to answer such call or the like, and the answering service may perform a range of answering duties on behalf of the professional. For example, upon answering the call on behalf of the professional, the answering service may let the caller know when the professional is scheduled to be available, or may collect information so that the professional can return the call at an opportune time. Likewise, the answering service may perform an assessment regarding the nature of the call and based thereon may perform a range of actions. Thus, the answering service may determine that a relatively more serious matter requires more immediate action from the professional, in which case the answering service may attempt to contact the professional as soon as possible by appropriate means. Correspondingly, the answering service may determine that a relatively less serious matter requires less immediate action from the professional, in which case the answering service may only create a message for the professional to be collected thereby at a later time.

Answering services are known, as are answering services specializing in particular fields. For example, an answering service may be operated specifically for funeral professionals and based thereon may develop particular procedures tailored to the needs of such funeral professionals, as is shown by the subject matter set forth in U.S. Pat. Nos. 8,467,515, 8,498,399, and 8,548,149, each of which is hereby incorporated by reference in its entirety, among others. Of course, answering services may also be operated specifically for other types of professionals and others, including doctors, lawyers, engineers, real estate agents, and the like.

Typically, a professional engages an answering service to answer calls to the professional, or one or more businesses to which the professional is associated each engage the answering service to answer calls to the business, among other things. In any case, the answering service engages the services of one or more telephone and/or data service providers or the like to effectuate forwarding of telephone and/or non-telephone calls or the like from the professional or each business (hereinafter, 'professional entity') to the answering service, particularly in a manner deemed necessary and/or advisable by the professional entity. Such engaging and such forwarding services are generally known and need not be set forth herein in any detail other than that which is provided. Generally, the forwarding may occur on any appropriate basis, including the time of day, whether forwarding has been positively engaged or disengaged, whether the professional entity has selected a particular call for forwarding, whether a call has rung a predetermined number of times, whether a call has not been responded to within a set period, whether a phone or phone system or data system of the business is off, or the like.

Notably, an agent of the answering service may answer an incoming call from a caller on behalf of a called professional entity according to a predetermined procedure or 'script' that has been established for the called professional entity. As may be appreciated, the agent can be a human or an automated construct. Also, the script can be quite involved, and can tend to cover a wide range of subjects, scenarios, and needs, and therefore can be quite extensive. Importantly, with the use of such a script, the agent can collect information from the caller/incoming call according to the script and enter same into an appropriate database or the like for later retrieval and use, as is generally known.

At some point during or after the incoming call from the caller, the agent at the answering service attempts to contact the called professional entity to relay at least some portion of the substance of the incoming call thereto. If the called professional entity is an individual professional, contacting same typically would involve calling, messaging, texting, or otherwise relaying to the professional information relating to the incoming call. Thus, it may be that the agent at the answering service contacts the individual professional by way of a phone call to a land line or mobile telephone having a telephone number associated therewith, a text message to a mobile telephone having a telephone number associated therewith, a data message to a computer having an electronic mail address, user ID, Internet address, or other identifier associated therewith, a push message to an application running on such a mobile telephone, computer, or other computing device, or the like. Similarly, if the professional entity is a business, contacting same typically would involve contacting an individual professional associated with the business in a likewise manner, perhaps according to predetermined rules for the business setting forth whom to contact.

Once the answering service contacts a professional regarding an incoming call from a caller, the professional may decide to place a return call to the caller in response to the incoming call. Typically, although by no means necessarily, placing the return call may involve the professional ascertaining an identifier of the caller by which the caller may be reached during the course of the return call. For example, the identifier may be a telephone number, electronic mail address, texting address, Internet address, or other identifier associated with the caller, which the caller may have provided during the incoming call or which may have been automatically ascertained from the incoming call, or even both. At any rate, with the identifier of the caller ascertained, the professional employs same to carry out the return call, be it by way of a telephone, a texting device, an electronic mail device, an application running on a computing device, or the like, as may be appropriate.

Notably, in carrying out the return call, an identifier of the professional may likewise be ascertained by the caller, where similar to before the identifier of the professional may be a telephone number, electronic mail address, texting address, Internet address, or other identifier associated with the professional, which the caller may automatically ascertain from the return call. For example, if the return call is a telephone call and the caller employs a caller identification service, the identifier of the professional could be a telephone number of a telephone device employed by the professional, where such telephone number of the professional is automatically displayed to the caller and likely stored on a telephone device employed by the caller.

The professional likely is not especially concerned with hiding from the caller or otherwise obscuring the identifier of such professional, be it a telephone number or otherwise. In fact, the professional may wish to encourage providing the caller with an identifier of such professional so that the caller can later call the professional again, thereby promoting and/or otherwise encouraging a relationship therebetween, be it a business relationship or otherwise. That said, the professional may wish to have control over the identifier provided to the caller during the return call. For example, the professional may wish to ensure that the identifier provided to the caller represents a favored location at which the professional may be later called. Similarly, if the identifier which would be otherwise provided to the caller during the return call is a personal identifier that the professional wishes to keep private, the professional may wish to ensure that the identifier provided to the caller is a professional identifier that the professional employs publicly.

Likewise, it may be that the professional is an individual associated with a business, and that the business and/or the professional wishes to ensure that the identifier provided to the caller during the return call is a business identifier that the business encourages the use of for calls in general. Thus, the business can ensure with the provided business identifier that calls associated therewith are routed through the business so that the business can assert better control over the calls, and so that the business can appropriately further route the calls as need be, among other things. Accordingly, if the caller later calls for the professional by way of the business identifier, and if the professional is not available to the caller during such later call, the business may instead route such later call to another professional which can communicate with the caller and appropriately service the needs of the caller without delay, for example. Also, and as should be evident, by ensuring that later calls from the caller are routed directly to the business, the business is in general better aware of the needs of the caller and the relationship therewith, and thereby can better service such needs and such caller.

Accordingly, a need exists for a system and method for allowing a professional to control the identifier provided when returning a call or message or the like from an answering service. In particular, a need exists for such a system and method where, an application is provided to the professional that allows same to control the identifier. Further, a need exists for such a system and method where the application allows the professional to select from among a number of identifiers including one or more predetermined identifiers. Also, a need exists for allowing the return call to be routed by way of the answering service so that the answering service can provide additional services, such as recording the return call for purposes including business management review or the like, timing the return call, notifying a third party of the return call, or the like, among other things.

SUMMARY

The aforementioned needs are satisfied by for example an application instantiated on a computing device of a professional. The application receives transmitted information from a service relating to an incoming call from a client for the professional, and displays at least a portion of the transmitted information to the professional. The displayed information includes at least one identifier of the client by which the professional can place a return call to the client.

The professional selects one of the identifiers of the client to place the return call to the client by way of the selected identifier of the client. Upon receiving the selection of the identifier of the client, the application presents to the professional a number of options for an identifier of the professional to be provided with the return call to the client, receives from the professional a selection of one of the options for the identifier of the professional, places the return call from the professional to the client, and in doing so provides the selected identifier of the professional with the return call. The selected and provided identifier of the professional represents a favored location at which the professional or an associate thereof may be reached. The client may ascertain the provided identifier of the professional from the return call and employ same to place a future call toward the professional or the associate thereof.

BRIEF DESCRIPTION OF THE DRAWINGS

The foregoing summary as well as the following detailed description of various embodiments of the present innovation will be better understood when read in conjunction with the appended drawings. For the purpose of illustrating the various embodiments of the innovation, there are shown in the drawings embodiments that are presently preferred. As should be understood, however, the innovation is not limited to the precise arrangements and instrumentalities shown. In the drawings.

DETAILED DESCRIPTION OF PREFERRED EMBODIMENTS

Figure 1:
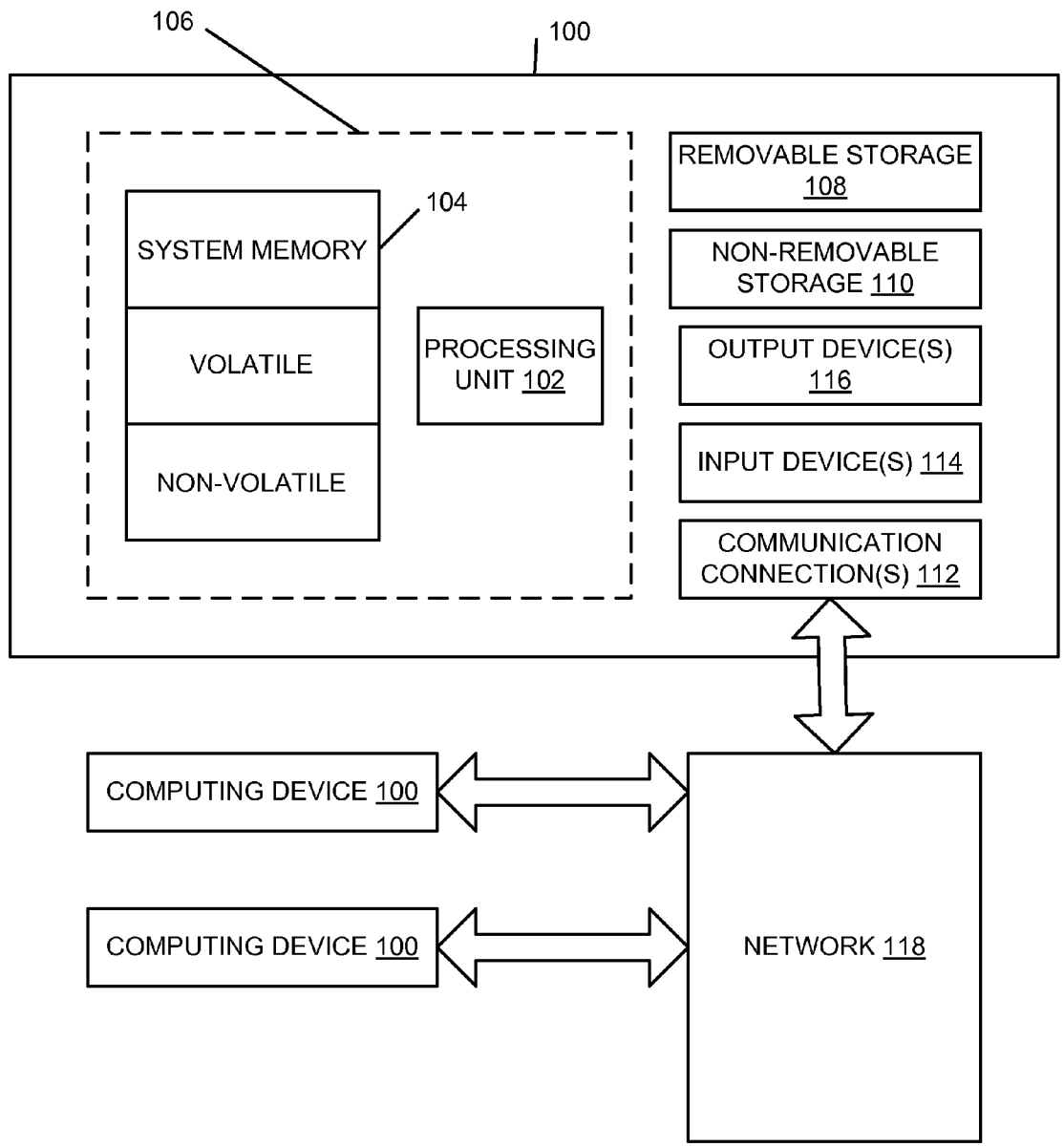
FIG. 1 is a block diagram of an example of a computing environment within which various embodiments of the present innovation may be implemented.

Certain terminology may be used in the following description for convenience only and is not limiting. The words "lower" and "upper" and "top" and "bottom" designate directions in the drawings to which reference is made. The terminology includes the words above specifically mentioned, derivatives thereof and words of similar import.

Where a term is provided in the singular, the inventors also contemplate aspects of the invention described by the plural of that term. As used in this specification and in the appended claims, the singular forms "a", "an" and "the" include plural references unless the context clearly dictates otherwise, e.g., "a tip" includes a plurality of tips. Thus, for example, a reference to "a method" includes one or more methods, and/or steps of the type described herein and/or which will become apparent to those persons skilled in the art upon reading this disclosure.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the preferred methods, constructs and materials are now described. All publications mentioned herein are incorporated herein by reference in their entirety. Where there are discrepancies in terms and definitions used in references that are incorporated by reference, the terms used in this application shall have the definitions given herein.

Example Computing Environment

FIG. 1 is set forth herein as an exemplary computing environment in which various embodiments of the present invention may be implemented. The computing system environment is only one example of a suitable computing environment and is not intended to suggest any limitation as to the scope of use or functionality. Numerous other general purpose or special purpose computing system environments or configurations may be used. Examples of well-known computing systems, environments, and/or configurations that may be suitable for use include, but are not limited to, personal data devices such as 'smart' mobile telephones, personal computers (PCs), server computers, handheld or laptop devices, multi-processor systems, microprocessor-based systems, network PCs, minicomputers, mainframe computers, embedded systems, distributed computing environments that include any of the above systems or devices, and the like.

Computer-executable instructions such as program modules executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing aspects described herein includes a computing device, such as computing device 100. In its most basic configuration, computing device 100 typically includes at least one processing unit 102 and memory 104. Depending on the exact configuration and type of computing device, memory 104 may be volatile (such as random access memory (RAM)), non-volatile (such as read-only memory (ROM), flash memory, etc.), or some combination of the two. This most basic configuration is illustrated in FIG. 1 by dashed line 106. Computing device 100 may have additional features and functionality. For example, computing device 100 may include additional storage (removable and/or non-removable) including, but not limited to, magnetic or optical disks or tape. Such additional storage is illustrated in FIG. 1 by removable storage 108 and non-removable storage 110.

Computing device 100 typically includes or is provided with a variety of computer-readable hardware media. Computer-readable media can be any available media that can be accessed by computing device 100 and includes both volatile and non-volatile media, removable and non-removable media. By way of example, and not limitation, computer-readable media may comprise computer storage media and communication media.

Computer storage media includes volatile and non-volatile, removable and non-removable media implemented in any method or technology for storage of information such as computer-readable instructions, data structures, program modules or other data. Memory 104, removable storage 108, and non-removable storage 110 are all examples of computer storage media. Computer storage media includes, but is not limited to, RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other computer-readable hardware medium which can be used to store the desired information and which can accessed by computing device 100. Any such computer storage media may be part of computing device 100.

Computing device 100 may also contain communications connection(s) 112 that allow the device to communicate with other devices 100. Each such communications connection 112 is an example of communication media. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection (including VoIP), and wireless media such as a Wi-Fi or cellular data network or the like, acoustic, radio frequency (RF), infrared and other wireless media. The term computer-readable media as used herein includes both storage media and communication media.

Computing device 100 may also have input device(s) 114 such as keyboard, mouse, pen, voice input device, touch input device, etc. Output device(s) 116 such as a display, speakers, printer, etc. may also be included. All these devices are generally known to the relevant public and therefore need not be discussed in any detail herein except as provided.

Notably, computing device 100 may be one of a plurality of computing devices 100 inter-connected by a network 118, as is shown in FIG. 1. As may be appreciated, the network 118 may be any appropriate network, each computing device 100 may be connected thereto by way of a connection 112 in any appropriate manner, and each computing device 100 may communicate with one or more of the other computing devices 100 in the network 118 in any appropriate manner. For example, the network 118 may be a wired or wireless network within an organization or home or the like, and may include a direct or indirect coupling to an external network such as a Wi-Fi or cellular data network or the like, the Internet or the like. Likewise, the network 118 may be such an external network.

Particularly in the case where the network 118 is an external network, such network 118 may be a digitally based network (including VoIP) for exchanging computer data among the devices 100, may be an audio and/or video network for exchanging audio and/or video data among the devices 100, or the like. Thus, it may be that the network 118 may be a public switched telephone network for landline telephone communications, a mobile switching center for wireless telephone communications, a paging network for distributing paging information, a private multimedia network for establishing video conferencing, or the like. Thus, it should be appreciated, that one or more of the computing devices 100 that are shown to the left of the network 118 in FIG. 1 may be a mobile telephone, a landline telephone, a pager, a mobile electronic mail device, a desktop electronic mail device, a mobile electronic texting device, a desktop electronic texting device, or a combination thereof, or the like, with appropriate hardware and software instantiated thereon.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing and implementing the presently disclosed subject matter.

In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application-program interface (API), reusable controls, or the like. Such programs may be implemented in a high-level procedural or object-oriented programming language to communicate with a computer system. However, the program(s) can be implemented in assembly or machine language, if desired. In any case, the language may be a compiled or interpreted language, and combined with hardware implementations.

Although exemplary embodiments may refer to utilizing aspects of the presently disclosed subject matter in the context of one or more stand-alone computer systems, the subject matter is not so limited, but rather may be implemented in connection with any computing environment, such as a network 118 or a distributed computing environment. Still further, aspects of the presently disclosed subject matter may be implemented in or across a plurality of processing chips or devices, and storage may similarly be effected across a plurality of devices in a network 118. Such devices might include personal computers, network servers, and handheld devices, for example.

Professional Answering Service

Figure 2:
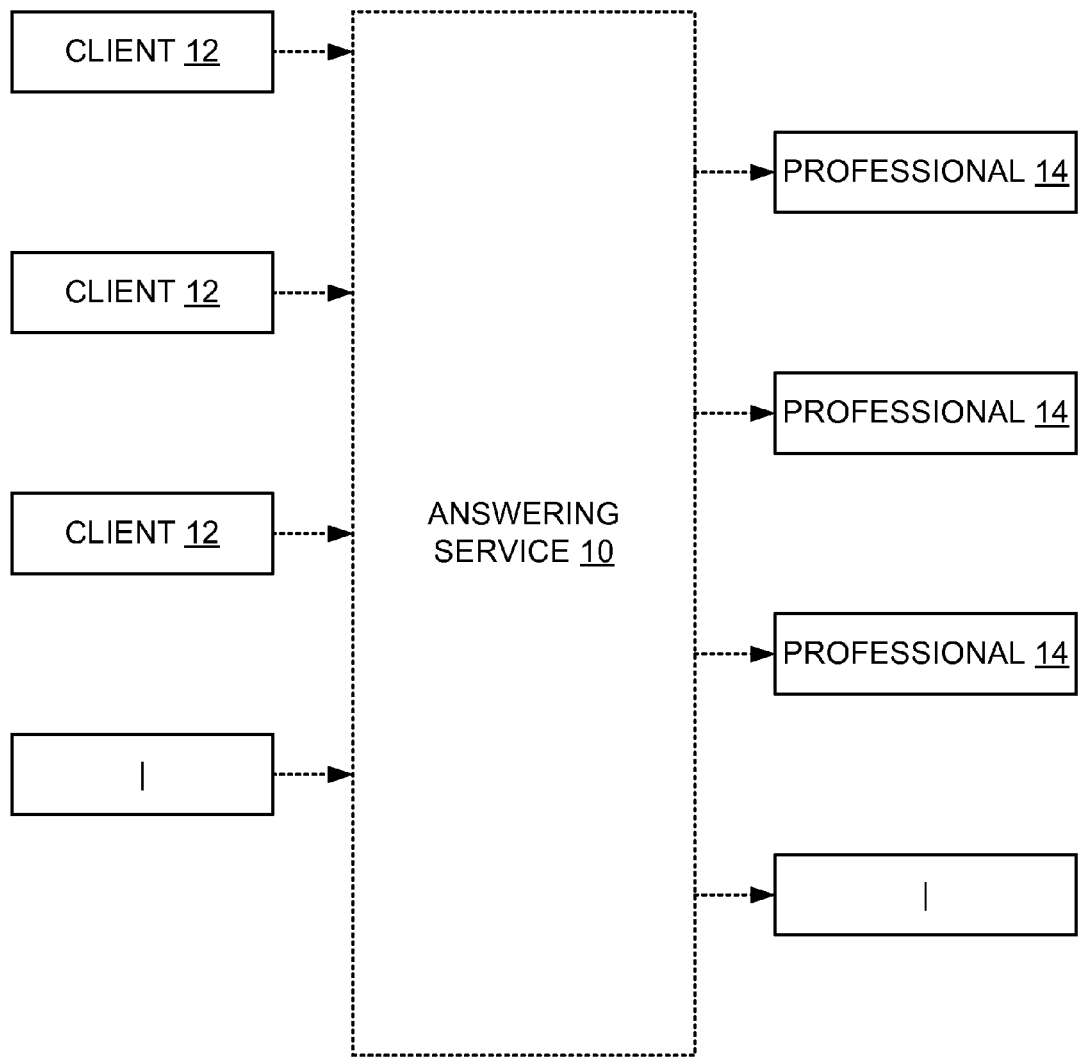
FIG. 2 is a block diagram showing a professional answering service provided to answer calls or the like from clients to professionals or the like in the event that the professionals are not willing or able to answer the calls.

Turning now to FIG. 2, it is seen that a professional answering service 10 is provided to answer each of one or more calls or the like from each of one or more clients 12 or the like to each of one or more professionals 14 or the like in the event that a particular professional 14 is not willing or able to answer a particular call from a particular client 12. Typically, although not necessarily, the answering service 10 is operated by a business organization that provides answering services or the like on behalf of multiple professionals 14. As was alluded to above, each client 12 and each professional 14 may be any appropriate respective client and professional without departing from the spirit and scope of the present innovation. Thus it may be that a particular professional 14 is a doctor, a lawyer, a service professional, a funeral director, or the like, among other things, and a particular client 12 calling to the professional 14 may require the professional services thereof, perhaps on an urgent basis.

The reason why the professional 14 does not answer a particular call may be most any reason without departing from the spirit and scope of the present innovation. For example, the professional 14 simply may not want to answer calls, such as for example if on a vacation or at a family event, among other things, or the professional 14 may be otherwise occupied by professional matters.

Presumptively, the call to the professional 14 from the client 12 is of a telephonic nature, at least for purposes of disclosing the present innovation in the present disclosure. Thus, it may be that the client 12 is employing a landline telephone or a mobile telephone (a device 100 of FIG. 1, e.g.), and is calling to a landline telephone or mobile telephone of the professional 14 (also a device 100 of FIG. 1, e.g.). Notably, though, the call to the professional 14 from the client 12 could be of some other nature without departing from the spirit and scope of the present innovation. For example, it may be that the client 12 is employing a digital electronic mail device or a digital texting device (again, a device 100 of FIG. 1, e.g.), and is addressing a digital electronic mail device or a digital texting device (once again, a device 100 of FIG. 1, e.g.) of the professional 14.

Particularly in the case where the call is telephonic in nature, and as seen in FIG. 2, the call from the client 12 to the professional 14 when not answered thereby is forwarded therefrom to the answering service 10 by appropriate means that have already been established in a generally known manner. Typically, and as was alluded to above, upon the professional 14 engaging the answering service 10 to answer calls on behalf of such professional 14, the answering service 10 communicates with one or more telephone service providers or the like to effectuate such forwarding. As should be understood, the forwarding may be performed according to any appropriate basis, including the time of day, whether forwarding has been positively engaged or disengaged, whether the professional 14 has selected a particular call for forwarding, whether a call has rung a predetermined number of times, whether a phone or phone system of the professional 14 is non-operational, or the like. In any case, the call from the client 12 to the professional 14 when not answered thereby is in fact answered by the answering service 10 on behalf of the professional 14.

Figure 3:
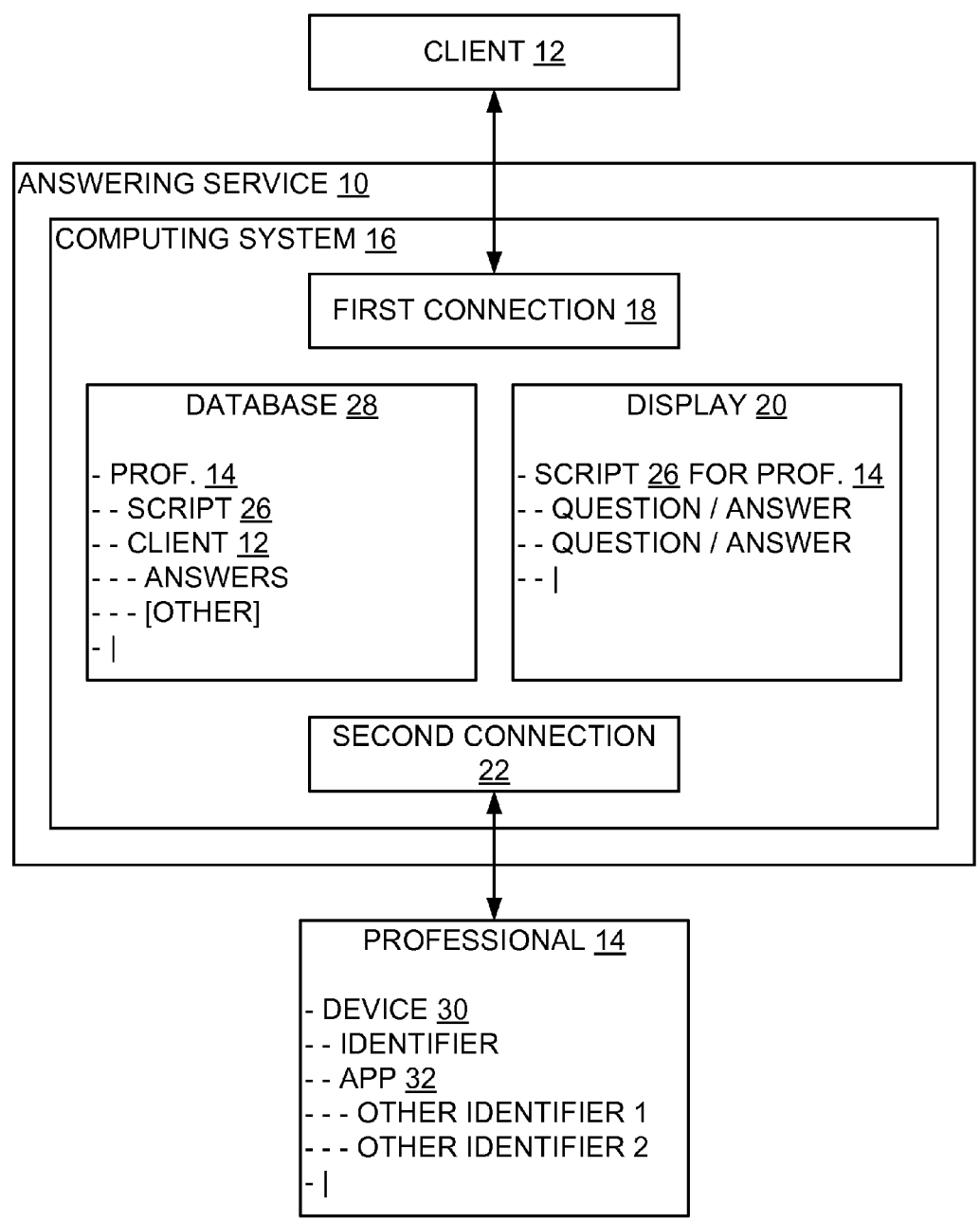
FIG. 3 is a block diagram of a computing system and device employed to answer an incoming call from the client of FIG. 2 to the professional of FIG. 2 as forwarded to the answering service of FIG. 2 in accordance with various embodiments of the present innovation.

Turning now to FIG. 3, it is seen with regard to various embodiments of the present innovation that an incoming call from a client 12 to a professional 14 as forwarded to an answering service 10 may be answered by an individual agent associated with the answering service 10 with the use of a computing system 16 instantiated by or on behalf of the answering service 10. Typically, although by no means necessarily, the computing system 16 is in the nature of the computing device 100 on the top part of FIG. 1 with appropriate hardware and software instantiated thereon. Here, it is to be appreciated that the computing system 16 may among other things include a first connection 18 or the like for receiving the forwarded incoming call from the client 10, a display 20 or the like upon which is shown various items, and a second connection 22 or the like for outgoing calls to the professional 14. As may be appreciated, the calls may be in the nature of voice calls or data calls such as electronic mail messages, text messages, or other data messages, and likewise the connections 18, 22 may be in the nature of voice, data, or other electronic connections. In at least some circumstances, the first connection 18 and the second connection 22 may be one and the same.

As was noted above, the agent at the computing system 16 of the answering service 10 may answer a particular forwarded incoming call from a client 10 on behalf of a particular professional 14 according to a predetermined procedure or 'script 26' that has been established for the particular professional 14. Accordingly, as an initial matter the incoming call is received on the first connection 18 of the computing system 16, is identified by the system 16 as being for a particular professional 14, and based thereon the system 16 obtains and runs the corresponding script 26, perhaps from a local or remote database 28. As may be appreciated, the system may identify the particular professional 14 for the incoming call in any appropriate manner, such as for example based on a caller ID, DNIS (Dialed Number Identification System), or other information associated with the incoming call. Such identifying is known or should be apparent to the relevant public and therefore need not be set forth herein in any detail other than that which is provided.

As may be appreciated, the obtained and run script 26 is in an electronic form, and may have any appropriate structure. Typically, although not necessarily, the script 26 includes a number of questions that are displayed on the display 20 of the computing system 16, the agent asks the questions to the calling client 12 and enters corresponding answers into appropriate pre-defined spaces in the display 20, and the entered answers can be stored in a record of appropriate form in the database 28 or elsewhere. As should be understood, the questions and answers relate to determining the purpose of the call from the calling client 12.

Based on such a script 26, the agent at the answering service 10 collects at least a portion of the information as dictated according to the script 26, and then transmits at least a portion of the collected information to the professional 14 by way of the second connection 22. As should be understood, the professional 14 typically can be contacted by way of a predetermined mobile telephone line, landline telephone line, pager, mobile electronic mail device, desktop electronic mail device, mobile electronic texting device, desktop electronic texting device, or a combination thereof, or the like. Such transmitting may be performed orally if over a telephone line or the like, or electronically if by way of an electronic message or the like. If electronically, a return receipt may be required to confirm that the professional 14 has received the transmission. With the transmitted information based on the incoming call from the client 12, the professional 14 can initiate a return call to the client 12.

Funeral Professional

The professional 14 of the present innovation may be most any professional. One example of such professional 14 is a funeral professional 14, including not only funeral directors but also related professionals and services such as funeral homes, cremation services, crematory facilities, cemetery and memorial parks, casket and coffin companies, livery services, trade embalmers, funeral transport services, coroners, monument companies, burial vault companies, grief and bereavement counselors, body and tissue donation services, pet cremation, burial and cemetery services, and the like. Among other things, such funeral professionals 14 share a common need for being able to return incoming calls from clients 12 in an expeditious manner, while at the same time being able to control the relationship with each client 12 so as to maintain a heightened level of dignity, caring, and compassion in connection with the services provided thereby to the client 12.

For example, a professional 14 who is a funeral director employed by a funeral chapel may wish to employ the answering service 10 in order to be notified quickly upon a client 12 calling to initially request funeral services, so that the funeral director can likewise quickly return the incoming call to the client 12 and secure the client 12. As may be understood, such quickness in achieving the return call to the client 12 may allow the funeral director to console the client 12 and attend to the needs of the client 12 that much sooner. As may also be understood, without such quickness of such return call, the client 12 may turn to another funeral director, thereby potentially denying the funeral director the opportunity to provide the client 12 with lucrative services.

Controlling Identifier Provided with Return Call

Once the answering service 10 contacts a professional 14 regarding an incoming call from a client 12, and as was alluded to above, the professional 10 may decide to place a return call to the client 12 in response to the incoming call. Typically, although by no means necessarily, placing the return call may involve the professional ascertaining an identifier of the client 12 by which the client 12 may be reached during the course of the return call. For example, the identifier of the client 12 may be a telephone number, electronic mail address, texting address, Internet address, or other identifier associated with the client 12, which the client 12 may have provided during the incoming call or which may have been automatically ascertained from the incoming call, or even both. At any rate, with the identifier of the client 12 ascertained, the professional 14 may employ same to carry out the return call, be it by way of a telephone, a texting device, an electronic mail device, an application running on a computing device, or the like, as may be appropriate.

Notably, and as was set forth above, in carrying out the return call, an identifier of the professional 14 may likewise be ascertained by the client 12, where similar to before the identifier of the professional 14 may be a telephone number, electronic mail address, texting address, Internet address, or other identifier associated with the professional 14, which the client 12 may automatically or at least readily ascertain from the return call. In a typical scenario, the return call is a telephone call from the professional 14 to the client 12, the client 12 employs a caller identification service such as 'Caller ID', and the identifier of the professional 14 is a telephone number of a telephone device employed by the professional 14, such as for example a landline phone or a wireless or mobile phone, in which case such telephone number of the professional 14 is automatically displayed to the client 12 and likely stored on a telephone device employed by the client 12.

Alternately, the return call may be in the nature of an electronic mail message or a text message from the professional 14, in which case the identifier of the professional 14 could be an associated telephone number of a telephone device employed by the professional 14 or an electronic mail address employed by the professional 14, among other things. Here too, such telephone number or electronic mail address of the professional 14 is automatically displayed to the client 12 and likely stored on a device employed by the client 12. In any instance, it can be presumed that the return call is some sort of communication that includes the identifier of the professional 14, where such identifier of the professional 14 is available to the client 12 for a future call to the professional 14.

As was noted above, the professional 14 likely is not especially concerned with hiding from the client 12 or otherwise obscuring the identifier of such professional 14, be it a telephone number or otherwise, as is provided with the return call to the client 12. In fact, the professional 14 may wish to encourage providing the client 12 with an identifier of such professional 14 so that the client 12 can later call to the professional.

That said, the professional 12 may nevertheless wish to have control over the identifier of such professional 14 that is provided to the client 12 during the return call. For example, and again, the professional 14 may wish to ensure that the identifier of the professional 14 provided to the client 12 represents a favored location at which the professional 14 may be later called. Thus, it may be that such a favored identifier is one where the professional 14 or an associate thereof is always available. Similarly, if the identifier of the professional 14 which would be otherwise provided to the client 12 during the return call is a personal identifier that the professional 14 wishes to keep private, the professional 14 may wish to ensure that the identifier of the professional 14 provided to the caller 14 is a professional identifier that the professional 14 employs publicly. Accordingly, the provided identifier would preferably be an identifier normally associated with professional activities of the professional 14, and not one normally associated with personal activities of the professional 14, even if the professional 14 is employing a personal device having a personal identifier to receive the aforementioned transmitted information from the answering service 10 and to place the return call to the client 12.

Likewise, and as was alluded to above, it may be that the professional 14 is an individual associated with a business, and that the business and/or the professional 14 wishes to ensure that the identifier provided to the client 12 during the return call is a business identifier that the business encourages the use of for calls in general. Thus, the business can ensure with the provided business identifier that calls associated therewith are routed through the business so that the business can assert better control over the calls, and so that the business can appropriately further route the calls as need be, among other things. Accordingly, if the client 12 later calls for the professional 14 by way of the business identifier, and if the professional 14 is not available to the client 12 during such later call, the business may instead route such later call to another professional 14 which can communicate with the client 12 and appropriately service the needs of the client 12 without delay, for example. Also, and as should be evident, by ensuring that later calls from the client 12 are routed directly to the business according to the provided business identifier, the business is in general better aware of the needs of the client 12 and the relationship therewith, and thereby can better service such needs and such client 12.

In one scenario presently contemplated, the professional 14, be it a funeral professional or otherwise, employs a smart phone or other similar mobile communications device 30 (hereinafter 'mobile 30') (FIG. 3) at which the professional 14 both receives the transmitted information from the answering service 10 relating to an incoming call from a client 12 and places the return call to the client 12 based at least in part on such received information, although a non-portable device 30 may also be employed without departing from the spirit and scope of the present innovation. In particular, the mobile 30 includes thereon an appropriately instantiated application ('app') 32 which among other things effectuates such receiving of such transmitted information and such placing of such return call. Presumptively, the app 32 is in the nature of software functionality employing hardware and/or other software functionality already present on or available to the mobile 30, although other arrangements may also be employed without departing from the spirit and scope of the present innovation.

Figure 4:
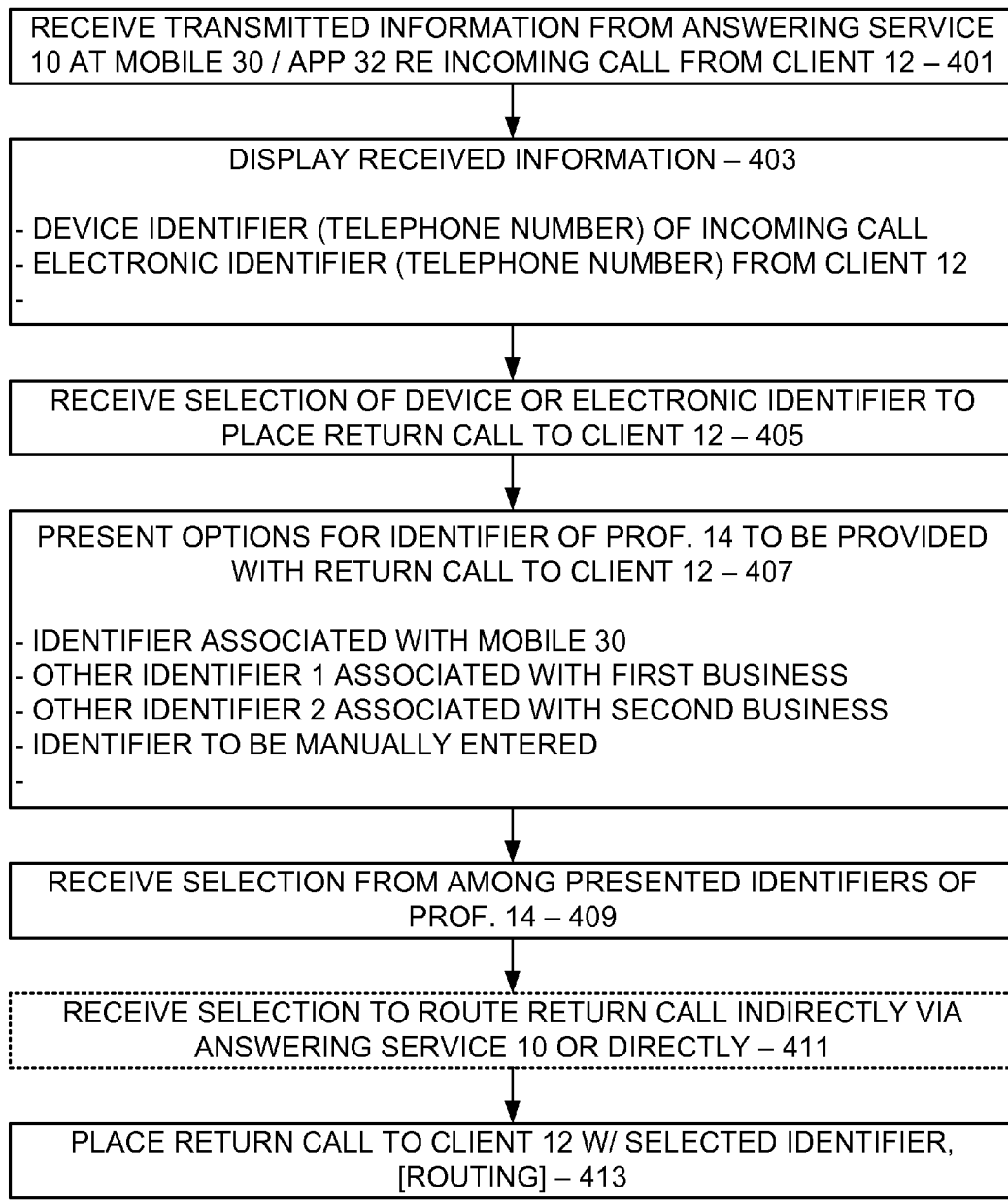
FIG. 4 is a flow diagram showing actions performed by the device of FIG. 3 in accordance with various embodiments of the present innovation.

In any event, and turning now to FIG. 4, in various embodiments of the present innovation, the professional 14 employs the mobile 30 and the app 32 thereon or the like to control the identifier of the professional 14 provided to the client 12 during the return call in the following manner. Preliminarily, it is to be presumed that a client 12 has already placed an incoming call to the professional 14, that the incoming call has already been forwarded to the answering service 10 and answered thereat, and that the answering service has already transmitted information to the professional 14 regarding the answered incoming call. Note, though, that in at least some instances the client 12 need not necessarily have communicated with the answering service 10 beforehand, such as for example if the client 12 sent a direct message to the professional 14 by way of an ancillary service or the like. At any rate, in various embodiments of the present innovation, the transmitted information is received at the mobile 30 by way of the app 32 (401) and displayed to the professional 14 by way of a screen or the like on the mobile 30 (403), where the received transmitted information may include:

a device identifier associated with the incoming call as automatically determined by way of an automatic identifier determination service, which may be the telephone number of the phone employed by the client 12 during the incoming call, for example, an electronic identifier associated with the client 12 as provided thereby, such as a telephone number, electronic mail address, etc., which may be different from the aforementioned device identifier, a name identifier associated with the incoming call as automatically determined by way of an automatic identifier determination service, which may be the name associated with the telephone number of the phone employed by the client 12 during the incoming call, for example, a name of the client 12 as provided thereby, which may be different from the aforementioned name identifier, a business or the like to which the incoming call was directed, if known, which may be the business that employs the professional 14, for example, a date and time the incoming call was received at the answering service 10, a temporal length of the incoming call, and other information relating to the incoming call as collected by the answering service 10, such as for example an indication of the nature of the incoming call, a person to whom the incoming call relates, the relationship of the client 12 to the person to whom the incoming call relates, a location of the person to whom the call relates, and the like, among other things.

Notably, the professional 14 accessing such received information by way of the app 32 on the mobile 30 is presented with one or more identifiers by which such professional 14 can place a return call to the client 12, including the device identifier associated with the incoming call as automatically determined and the electronic identifier associated with the client 12 as provided thereby. As should be appreciated here, it may be that the device identifier is not in fact an appropriate identifier for placing the return call, for example if the device identifier is clearly not meaningfully associated with the client 12. For example, the name identifier may show that the device identifier is associated with an entity not bearing any close relationship to the client 12. Likewise, it may be that the electronic identifier is not in fact an appropriate identifier for placing the return call, for example if the electronic identifier is clearly a home telephone number and the client 12 called minutes ago from a hospital. In various embodiments of the present innovation, the app 32 presents such identifiers to the professional 14 in a format by which the app 32 may receive a selection from among such presented identifiers by the professional 14 to place such return call to such client 12 (405). Such receiving of such selection may be accomplished in most any appropriate manner without departing from the spirit and scope of the present innovation. For example, if the app 32 on the mobile 30 employs a touch screen thereon, the selecting and receiving thereof may involve the professional 14 touching one of the presented identifiers as displayed on the screen to place the return call to the client 12. Similarly, if the app 32 on the mobile 30 employs an audible (sound-based) interface, the selecting and receiving thereof may involve the professional 14 speaking one of the presented identifiers as stated by the audio interface to place the return call to the client 12.

In various embodiments of the present innovation, the app 32 on the mobile 30 does not immediately place the return call to the client 12 by way of the received selected identifier at 405. Instead, the app 32 upon receiving the selection of the identifier presents to the professional 14 by way of the screen or audio interface or the like on the mobile 30 a number of options for an identifier of the professional 14 to be provided with the return call to the client 12 (407), where the identifier of the professional 14 as provided is to be ascertained by the client 12 in connection with the return call. Thus, the app 32 receives a selection from the professional 14 from among the presented identifiers of the professional 14 (409), whereby the client 12 may ascertain the selected identifier of the professional 14 and employ same to place a future call to the professional 14, an entity associated with the professional 14, or the like. Similar to before, receiving such selection may be accomplished in most any appropriate manner without departing from the spirit and scope of the present innovation. For example, if the app 32 on the mobile 30 employs a touch screen thereon, the selecting and receiving thereof may involve the professional 14 touching one of the presented identifiers as displayed on the screen. Similarly, if the app 32 on the mobile 30 employs an audible (sound-based) interface, the selecting and receiving thereof may involve the professional 14 speaking one of the presented identifiers as stated by the audio interface.

Presumptively, at least some of presented identifiers as displayed to the professional 14 at 407 are predetermined identifiers, while at least some of the presented identifiers are dynamically generated according to circumstances. Thus, the presented identifiers of the professional 14 as displayed at 407 may include:

an identifier associated with the mobile 30 of the professional 14, such as for example a telephone number if the mobile 30 is a smart phone or the like, an identifier ('other identifier 1' in FIG. 3) associated with a (first) business to which the professional 14 is affiliated, such as for example a telephone number of a land line of the first business or the like, an identifier ('other identifier 2' in FIG. 3) associated with another (second) business to which the professional 14 is affiliated, such as for example a telephone number of a land line of the second business or the like, such as may be the case if the professional 14 is associated with both the first and the second businesses, and an identifier to be manually entered by the professional 14, or the like, among other thing. Accordingly, the professional 14 in selecting one of the identifiers as at 409 may control the identifier of such professional 14 as provided with the return call, and in doing so can ensure that the identifier of the professional 14 as provided to the client 12 with the return call represents the favored location at which the professional 14 may be later called in the course of a future call from the client 12, or else the favored location at which an associate of the professional 14 may be later called in the course of a future call from the client 12, or the like.

In various embodiments of the present innovation, in addition to selecting from the selected identifiers as at 409, the app 32 on the mobile 30 may also allow the professional 14 to select whether the return call is routed indirectly from the mobile 30 to the client 12 by way of the answering service 10, or directly from the mobile 30 to the client 12 without the answering service 10 interposed therebetween (411). As may be appreciated, if the answering service 10 is interposed between the professional 14 and the client 12 during the return call, the answering service takes part in the return call, and can provide additional services, such as recording the return call for purposes including business management review or the like, timing the return call, notifying a third party of the return call, or the like, among other things. Correspondingly, if the answering service 10 is not interposed between the professional 14 and the client 12 during the return call, the answering service takes no part in the return call, and cannot provide such additional services. Placing the call directly or indirectly and interposing the answering service 10 are known or should be apparent to the relevant public and therefore need not be set forth herein in any detail other than that which is set forth. Accordingly, such direct or indirect calling and interposing may be performed in any appropriate manner without departing from the spirit and scope of the present innovation.

In other embodiments of the present innovation, the app 32 on the mobile 30 does not allow the professional 14 to select whether the return call is routed indirectly or directly from the mobile 30 to the client 12 by way of the answering service 10 as at 411, but instead automatically makes such selection based on the identifier of the professional 14 as selected at 409. Accordingly, it may be that if the identifier of the mobile 30 of the professional is selected at 409, the return call is routed directly, while if the identifier associated with the first or second business is selected at 409, the return call is routed indirectly. In still other embodiments of the present innovation, the app 32 on the mobile 30 does not allow the professional 14 to select whether the return call is routed indirectly or directly from the mobile 30 to the client 12 by way of the answering service 10 as at 411, but instead routes all returned calls either directly or indirectly.

At any rate, with the selection from the professional 14 of one of the identifiers thereof as at 409 to be provided with the return call, and with the selection from the professional (if available) of whether the return call is routed indirectly or directly from the mobile 30 to the client 12 by way of the answering service 10 as at 411, the app 32 on the mobile 30 proceeds to place the return call from the professional 14 to the client 12 (413). In doing so, the app 32 and/or the mobile 30 in fact provide the selected identifier of the professional 14 as received at 409 with the return call, and in fact route the return call indirectly or directly from the mobile 30 to the client 12 by way of the answering service 10 according to the selection of 411 (if available). Thus, the provided identifier of the professional 14 as received by the client 12 in connection with the return call is available thereto if such client 12 indeed needs to later call the professional 14 at a favored location. Placing the return call and providing the selected identifier of the professional 14 therewith are known or should be apparent to the relevant public and therefore need not be set forth herein in any detail other than that which is set forth. Accordingly, such placing of such return call and such providing of such identifier therewith may be performed in any appropriate manner without departing from the spirit and scope of the present innovation.

CONCLUSION

To summarize, in the present innovation, a professional 14 uses an app 32 on a mobile 30 or the like to initiate a communication (phone call, text message, etc.) to a client 12. The app 32 can present messages from an answering service 10. The communication can be initiated by for example tapping a phone number or text number. If employing a phone number to place a phone call, for example, the app 32 allows the professional 14 to (1) dial directly from the mobile 30 and provide the identifier associated therewith, or (2) dial the phone number indirectly by routing this phone call through the answering service 10 and provide a specific professional identifier that can be selected from a list, among other things. If the professional 14 chooses to dial indirectly through the answering service 10, an additional option may be for the answering service 10 to record the phone call for professional business review. The professional 14 and/or a business thereof can require (1) that all phone calls indirectly placed through the answering service 10 be recorded, (2) that no phone calls indirectly placed through the answering service 10 be recorded; or (3) the professional 14 can choose whether to record each phone call.

The programming believed necessary to effectuate the processes performed by the computing system 16 and the app 32 on the mobile 30 in connection with the various embodiments of the present innovation is relatively straightforward and should be apparent to the relevant programming public. Accordingly, such programming is not attached hereto. Any particular programming, then, may be employed to effectuate the various embodiments of the present innovation without departing from the spirit and scope thereof.

In the present innovation, a method and mechanism are set forth for allowing a professional 14 to control the identifier thereof provided when returning a call or message or the like as received by way of an answering service 10 to a client 12. An app 32 is provided on a mobile 30 of the professional 14 that allows same to control such provided identifier. The app 32 allows the professional 14 to select from among a number of identifiers thereof including one or more predetermined identifiers. The return call can be routed by way of the answering service 10 so that the answering service 10 can provide additional services, such as recording the return call for purposes including business management review or the like, timing the return call, notifying a third party of the return call, or the like, among other things.

It should be appreciated that changes could be made to the embodiments described above without departing from the innovative concepts thereof. For example, although the present innovation is set forth with specific reference to a funeral professional 14 or the like, such innovation may also be practiced by any other appropriate type of professional 14 that would prefer to control the identifier thereof provided when returning a call. Moreover, although the present innovation is set forth primarily in terms of telephonic calls or the like, such innovation may also be practiced in connection with any other appropriate type of communications medium and other types of call, perhaps with suitable modification. Likewise, although the present innovation is set forth with reference to the use of an answering service 10, such answering service 10 need not necessarily be employed, in which case the incoming and/or return calls may be any form of calls, with suitable modification. It should be understood, therefore, that this innovation is not limited to the particular embodiments disclosed, but it is intended to cover modifications within the spirit and scope of the present innovation as defined by the appended claims.

The invention claimed is:

1. A method performed by an application instantiated on a computing device of a professional, the method comprising:

receiving transmitted information from an answering service relating to an incoming call from a client for the professional, the client having placed the incoming call to the professional, the incoming call having been forwarded to the answering service and answered thereat, the transmitted information having been sent from the answering service to the professional regarding the answered incoming call;

displaying at least a portion of the transmitted information on the computing device and to the professional, the displayed information including at least one identifier of the client by which the professional can place a return call from the computing device to the client;

receiving a selection of the at least one identifier of the client by the professional to place the return call from the computing device to the client by way of the selected identifier of the client;

upon receiving the selection of the identifier of the client, presenting to the professional a number of options for an identifier of the professional to be provided with the return call to the client, the options including an identifier associated with the computing device of the professional, an identifier associated with a business to which the professional is affiliated, and an identifier to be manually entered by the professional;

receiving from the professional a selection of one of the options for the identifier of the professional to be provided with the return call to the client;

presenting to the professional a routing option to determine whether the return call is routed indirectly from the computing device to the client by way of the answering service, or directly from the computing device to the client without the answering service interposed therebetween;

receiving from the professional a selection based on the routing option; and placing the return call from the professional to the client and in doing so providing the selected identifier of the professional with the return call and routing the return call indirectly or directly according to the selection thereof, whereby the selected and provided identifier of the professional represents a favored location at which the professional or an associate thereof may be reached, and whereby the client may ascertain the provided identifier of the professional from the return call and employ same to place a future call toward the professional or the associate thereof, and whereby the answering service if interposed between the professional and the client during the return call takes part in the return call and provides additional services relating to the return call.

2. The method of claim 1 wherein the computing device is a mobile communications device.

3. The method of claim 1 wherein the incoming and return calls are telephone calls, the computing device includes telephonic communications capabilities, and each identifier is a telephone number.

4. The method of claim 1 wherein the incoming and return calls are electronic messages, the computing device includes electronic message communications capabilities, and each identifier is an electronic message address.

5. The method of claim 1 wherein the service is an answering service, the client having placed the incoming call to the professional, the incoming call having been forwarded to the answering service and answered thereat, the transmitted information having been sent from the answering service to the professional regarding answered incoming call.

6. The method of claim 1 wherein the displayed information includes identifiers of the client including a device identifier associated with the incoming call as automatically determined by way of an automatic identifier determination service, and an electronic identifier associated with the client as provided thereby, the method comprising receiving a selection from among the device identifier and the electronic identifier by the professional to place the return call to the client by way of the selected identifier.

7. A computing device of a professional, the computing device having a memory, a processor, and an application instantiated in the memory and operating with the processor to perform actions comprising:

receiving transmitted information from an answering service relating to an incoming call from a client for the professional, the client having placed the incoming call to the professional, the incoming call having been forwarded to the answering service and answered thereat, the transmitted information having been sent from the answering service to the professional regarding the answered incoming call;

displaying at least a portion of the transmitted information on the computing device and to the professional, the displayed information including at least one identifier of the client by which the professional can place a return call from the computing device to the client;

receiving a selection of the at least one identifier of the client by the professional to place the return call from the computing device to the client by way of the selected identifier of the client;

upon receiving the selection of the identifier of the client, presenting to the professional a number of options for an identifier of the professional to be provided with the return call to the client, the options including an identifier associated with the computing device of the professional, an identifier associated with a business to which the professional is affiliated, and an identifier to be manually entered by the professional;

receiving from the professional a selection of one of the options for the identifier of the professional to be provided with the return call to the client;

presenting to the professional a routing option to determine whether the return call is routed indirectly from the computing device to the client by way of the answering service, or directly from the computing device to the client without the answering service interposed therebetween;

receiving from the professional a selection based on the routing option; and placing the return call from the professional to the client and in doing so providing the selected identifier of the professional with the return call and routing the return call indirectly or directly according to the selection thereof, whereby the selected and provided identifier of the professional represents a favored location at which the professional or an associate thereof may be reached, and whereby the client may ascertain the provided identifier of the professional from the return call and employ same to place a future call toward the professional or the associate thereof, and whereby the answering service if interposed between the professional and the client during the return call takes part in the return call and provides additional services relating to the return call.

8. The computing device of claim 7 wherein the computing device is a mobile communications device.

9. The computing device of claim 7 wherein the incoming and return calls are telephone calls, the computing device includes telephonic communications capabilities, and each identifier is a telephone number.

10. The computing device of claim 7 wherein the incoming and return calls are electronic messages, the computing device includes electronic message communications capabilities, and each identifier is an electronic message address.

11. The computing device of claim 7 wherein the service is an answering service, the client having placed the incoming call to the professional, the incoming call having been forwarded to the answering service and answered thereat, the transmitted information having been sent from the answering service to the professional regarding the answered incoming call.

12. The computing device of claim 7 wherein the displayed information includes identifiers of the client including a device identifier associated with the incoming call as automatically determined by way of an automatic identifier determination service, and an electronic identifier associated with the client as provided thereby, the method comprising receiving a selection from among the device identifier and the electronic identifier by the professional to place the return call to the client by way of the selected identifier.

13. The method of claim 1 wherein the selected identifier of the professional to be provided with the return call is the identifier to be manually entered by the professional, the method further comprising receiving from the professional the manually entered identifier.

14. The computing device of claim 7 wherein the selected identifier of the professional to be provided with the return call is the identifier to be manually entered by the professional, the method further comprising receiving from the professional the manually entered identifier.

\* \* \* \* \*